United States Patent
Herrero (10) Patent No.: US 9,866,384 B2
(45) Date of Patent: *Jan. 9, 2018

(54) MEDIA DETECTION OF ENCRYPTED TUNNELED DATA

(71) Applicant: Oracle International Corporation, Redwood Shores, CA (US)

(72) Inventor: Rolando Herrero, Derry, NH (US)

(73) Assignee: Oacle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/881,592

(22) Filed: Oct. 13, 2015

(65) Prior Publication Data
US 2017/0104596 A1    Apr. 13, 2017

(51) Int. Cl.
H04L 29/06    (2006.01)
H04L 9/32    (2006.01)
H04L 29/08    (2006.01)

(52) U.S. Cl.
CPC .............. H04L 9/32 (2013.01); H04L 67/141 (2013.01)

(58) Field of Classification Search
CPC ..... H04L 63/04; H04L 63/0272; H04L 65/80; H04L 65/4015; H04L 65/602; H04L 45/24; H04L 63/162
See application file for complete search history.

(56) References Cited

U.S. PATENT DOCUMENTS

| 6,631,416 | B2* | 10/2003 | Bendinelli | H04L 12/2602 709/217 |
| 7,260,650 | B1* | 8/2007 | Lueckenhoff | H04L 69/16 709/246 |
| 7,627,750 | B1* | 12/2009 | Chan | H04H 20/38 380/201 |
| 7,739,728 | B1* | 6/2010 | Koehler, Jr. | H04L 63/0853 713/153 |
| 2004/0081333 | A1* | 4/2004 | Grab | H04K 1/00 382/100 |
| 2011/0188703 | A1* | 8/2011 | Yang | H04N 21/2347 382/100 |
| 2012/0066389 | A1* | 3/2012 | Hegde | G06F 9/4856 709/226 |
| 2013/0283037 | A1 | 10/2013 | Katz et al. | |

(Continued)

OTHER PUBLICATIONS

H. Schulzrinne et al.; "RTP: A Transport Protocol for Real-Time Applications";Jul. 2003; 89 pages.

(Continued)

*Primary Examiner* — Harunur Rashid
(74) *Attorney, Agent, or Firm* — Miles & Stockbridge P.C.

(57) ABSTRACT

A system that performs encrypted media detection for real-time communications ("RTC") establishes a tunnel by a tunneling server with a tunneling client of a user equipment ("UE"). The system receives a request from the UE to enable the encrypted media detection for the tunnel and sends a response back to the UE to indicate that the encrypted media detection is enabled for the tunnel. For each encrypted frame transmitted over the tunnel, the system stores corresponding data that includes at least one of a payload size, an inter-frame delay or a payload entropy. Based on stored corresponding data, the system determines if the encrypted frame includes an encrypted media data frame.

20 Claims, 5 Drawing Sheets

(56) References Cited

U.S. PATENT DOCUMENTS

| | | | |
|---|---|---|---|
| 2014/0095862 A1* | 4/2014 | Yang | H04L 63/164 |
| | | | 713/151 |
| 2014/0169562 A1* | 6/2014 | Billonneau | H04L 63/164 |
| | | | 380/270 |
| 2014/0379931 A1 | 12/2014 | Gaviria | |
| 2015/0039687 A1 | 2/2015 | Waxman et al. | |
| 2015/0052601 A1* | 2/2015 | White | H04L 63/1416 |
| | | | 726/13 |
| 2015/0058622 A1* | 2/2015 | Sturgill | H04L 63/0421 |
| | | | 713/160 |

OTHER PUBLICATIONS

3rd Generation Partnership Project; Technical Specification Group Services and System Aspects; Study on firewall traversal (Stage 2) (Release 12); 3GPP TR 33.830 V0. 5.0 (Nov. 2013).

* cited by examiner

MEDIA DETECTION OF ENCRYPTED TUNNELED DATA

FIELD

One embodiment is directed generally to a communications network, and in particular, to the transmission of encapsulated media within a tunnel over a communications network.

BACKGROUND INFORMATION

Many enterprise environments have replaced their Public Switched Telephone Network ("PSTN") telephony services with telephony services that use the Internet Protocol ("IP"), commonly known as Voice over IP ("VoIP") or IP Telephony. Since IP Telephony uses an IP network as its backbone, it can provide advanced features such as video conferencing, call recording, and call forwarding.

Recently, the growing base of mobile data subscribers, the wide availability of Internet access, and the high availability of bandwidth in both fixed and mobile networks has resulted in the popularity of advanced services accessed via the Internet (known as Over-the-Top ("OTT") services). This has caused competitive service providers to offer OTT services and hence face corresponding challenges as they implement these new services.

SUMMARY

One embodiment is a system that performs encrypted media detection for real-time communications ("RTC"). The system establishes a tunnel by a tunneling server with a tunneling client of a user equipment ("UE"). The system receives a request from the UE to enable the encrypted media detection for the tunnel and sends a response back to the UE to indicate that the encrypted media detection is enabled for the tunnel. For each encrypted frame transmitted over the tunnel, the system stores corresponding data that includes at least one of a payload size, an inter-frame delay or a payload entropy. Based on stored corresponding data, the system determines if the encrypted frame includes an encrypted media data frame.

DETAILED DESCRIPTION

One embodiment transmits streams of encrypted and encapsulated data in the form of frames over a tunnel. An embodiment detects media data (e.g., real-time voice traffic) among the streaming encrypted data. An embodiment can further provide quality improvements and enhancement features to the detected encrypted media data.

Figure 1:
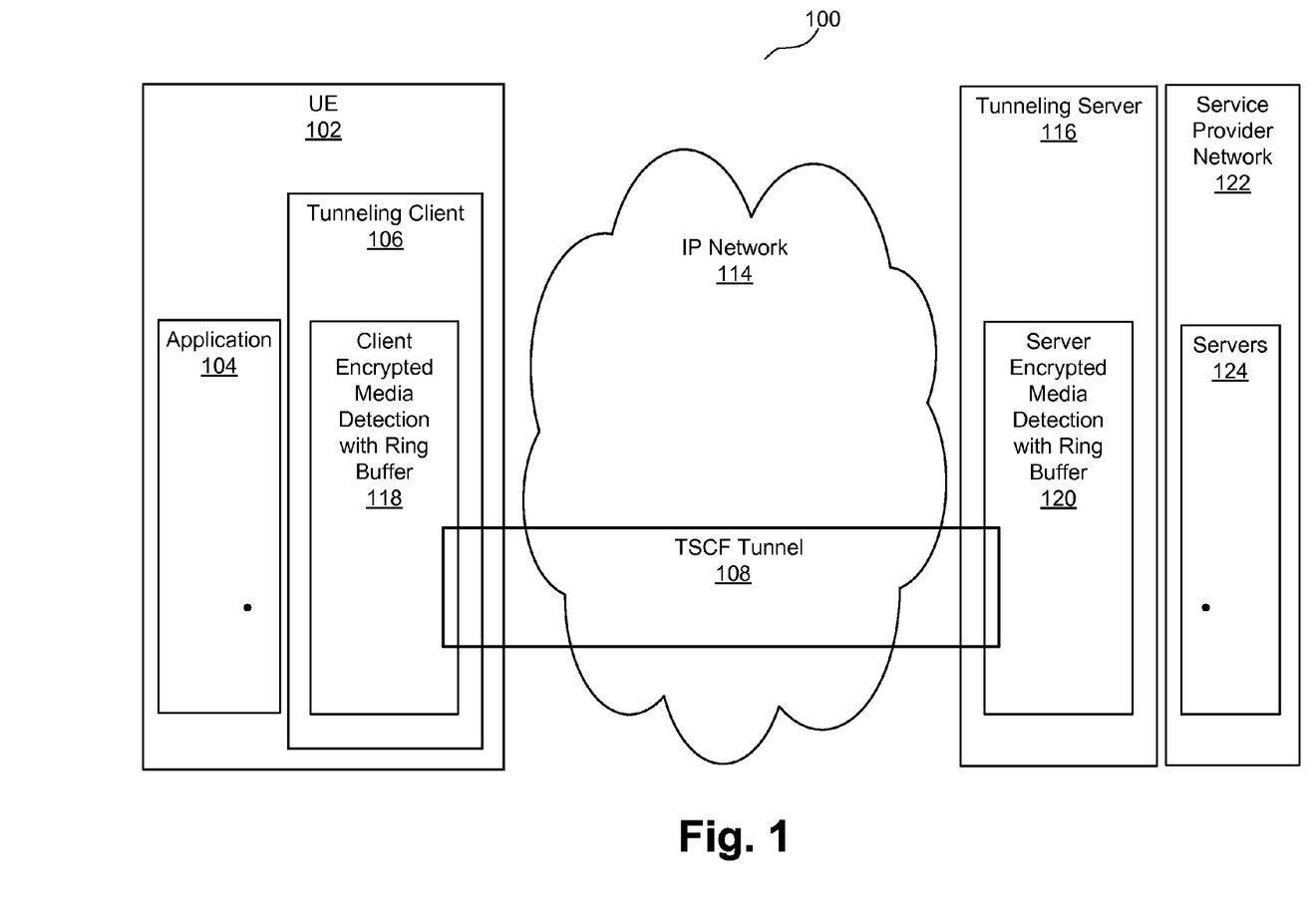
FIG. 1 is an overview diagram of a network including network elements that implement embodiments of the present invention and/or interact with embodiments of the present invention.

FIG. 1 is an overview diagram of a network 100 including network elements that implement embodiments of the present invention and/or interact with embodiments of the present invention. Network 100 includes a user equipment ("UE") 102 that performs real-time communications ("RTC") over an Internet Protocol ("IP") network 114 with a service provider network/backbone 122. In RTC, users exchange information instantly or with insignificant latency. Example applications for RTC include voice and/or video calls, application streaming, softphones, and remote desktop applications. UE 102 may be any device used by an end-user for communications, such as a smartphone, a laptop computer, a tablet, a television, etc.

In performing RTC, UE 102 communicates signaling and media traffic with respective servers 124 in service provider network 122. Signaling traffic may be communicated according to an application layer protocol such as the Session Initiation Protocol ("SIP"). SIP is configured to be independent of the underlying transport layer. Accordingly, SIP can run on different transport protocols, such as the Transmission Control Protocol ("TCP" as described in, for example, Internet Engineering Task Force ("IETF") request for comments ("RFC") 793 and RFC 675), the User Datagram Protocol ("UDP" as described in, for example, IETF RFC 768), etc.

Network 100 further includes a tunneling server 116 that, together with a tunneling client 106 within UE 102, provides functionality for establishing and managing one or more tunnels for performing RTC according to the Tunneled Services Control Function ("TSCF") standard as described in, for example, 3rd generation partnership program ("3GPP") technical report ("TR") 33.830 V0.5.0, the disclosure of which is hereby incorporated by reference in its entirety. In one embodiment, tunneling client 106 and tunneling server 116 establish a TSCF tunnel 108 that is compliant with TSCF tunnel management (e.g., tunnel initialization, maintenance, termination, etc., as defined by, e.g., 3GPP TR 33.830 V0.5.0), and TSCF tunnel transport protocols are supported for the negotiation of TSCF tunnel 108 between tunneling client 106 and tunneling server 116.

The TSCF standard provides client side and server side network elements for establishing managed tunnels for performing RTC (e.g., tunneling client 106 and tunneling server 116 in FIG. 1). It also provides two types of outer layer tunneling transports: a stream-based outer layer tunneling transport via TCP or Transport Layer Security ("TLS"), and a datagram-based outer layer tunneling transport via UDP or Datagram Transport Layer Security ("DTLS").

TLS is a cryptographic protocol as provided in, for example, IETF RFC 2246, RFC 4346, RFC 5246, and/or RFC 6176. DTLS is a protocol that provides communications privacy for datagram protocols. TCP and TLS provide reliable, ordered and error-checked delivery of the inner layer traffic, but introduce undesirable latency that is detrimental to RTC applications over a communications network that experiences impairments. On the other hand, UDP and DTLS do not guarantee reliable delivery, thus minimizing latency and being desirable for RTC.

In some embodiments, IP network 114 may include security devices (e.g., firewalls, proxies, etc.) that allow traffic of only a certain transport protocol (e.g., only TCP, only UDP, etc.). Accordingly, tunneling client 106 and tunneling server 116 may establish and manage TSCF tunnel 108 such that UE 102 may use it to traverse such security devices and connect to tunneling server 116 to reach servers 124 in service provider network 122.

The TSCF standard further provides control messages for exchanging configuration information between tunneling client 106 and tunneling server 116. According to the TSCF standard, control messages are of a "request/response" type, and a control message response for a request includes either a corresponding reply or an error code indicating why the request cannot be honored by the receiving end. TSCF control messages use a Type Length Value ("TLV") encoding. TLV is a variable length concatenation of a unique type and a corresponding value.

Each TSCF control message includes a control message ("CM") header at the beginning, including a "CM_Version" field identifying the version of the header and indicating the outer transport protocol of a TSCF tunnel, a "CM_Indication" field identifying whether the message is a control message or not, a "Reserved" field reserved for future use, a "CM_Type" field identifying the type of the control message (e.g., whether it is a request or a response, the corresponding functionality, etc.), a "TLV_Count" field indicating the number of TLVs that follow or are appended to the header in the corresponding control message, a "Tunnel Session ID" ("TSID") field including a tunnel session identifier ("ID") assigned by tunneling server 116 to uniquely identify TSCF tunnel 108, and a "Sequence" field that is incremented per message, as described in, for example, 3GPP TR 33.830 V0.5.0.

In one embodiment, in order to establish TSCF tunnel 108, tunneling client 106 sends a "configuration request" message to tunneling server 116 to obtain configuration information for TSCF tunnel 108. In a "configuration request" message, the TSID header field bits are set to 1 (i.e., FFFF . . . ). In response, tunneling server 116 assigns a TSID to a TSCF tunnel and sends a "configuration response" message back to tunneling client 106. The "configuration response" message includes the TSID assigned by tunneling server 116 to TSCF tunnel 108. The subsequent messages between tunneling client 106 and tunneling server 116 include this assigned TSID in their headers.

In one embodiment, if a control message is communicated between tunneling client 106 and tunneling server 116 and does not include the expected TSID, the control message is dropped and the corresponding TSCF tunnel is terminated. Alternatively, in one embodiment, tunneling client 106 may send a "configuration release request" message to tunneling server 116 to terminate a TSCF tunnel. In response to such a "configuration release request" message, tunneling server 116 sends a "configuration release response" message to tunneling client 106. At this time, TSCF tunnel 108 is terminated.

In one embodiment, UE 102 executes an application 104 that may be a SIP based RTC application relying on a library such as the software development kit ("SDK") provided by the Tunneled Session Management ("TSM") solution from Oracle Corp. The TSM solution employs a client/server architecture using session border controllers ("SBCs") and client applications, such as application 104, that may be developed using the SDK. The client applications initiate secure communications sessions with the service provider over the Internet. The session border controllers (e.g., implemented by tunneling server 116) at the edge of the network terminate and control the tunnels before passing the secure traffic into the service core of service provider network 122. In one embodiment, SDKs are implemented by a client encrypted media detection module 118 and/or a server encrypted media detection module 120.

For some applications, encryption of RTC traffic that traverses tunnel 108 may be necessary in order to provide secure communications services at UE 102. In general, for the functionality of tunnel 108, client encrypted media detection module 118 and/or server encrypted media detection module 120 detects which of the encrypted streaming traffic that is traversing tunnel 108 is media data (e.g., voice call data), and may provide enhancement features to the detected media data. The SDKs in general provide additional APIs beyond "standard" TSCF APIs in order to implement the functionality disclosed herein.

One embodiment provides TSCF SDKs that support an application programming interface ("API") so that application 104 can enable the detecting encrypted media functionality. The TSCF SDK provides a Berkeley software distribution ("BSD")-like socket API that can be used to send and receive encapsulated media using the tsc_sendto and tsc_recvfrom functions, respectively.

Figure 2:
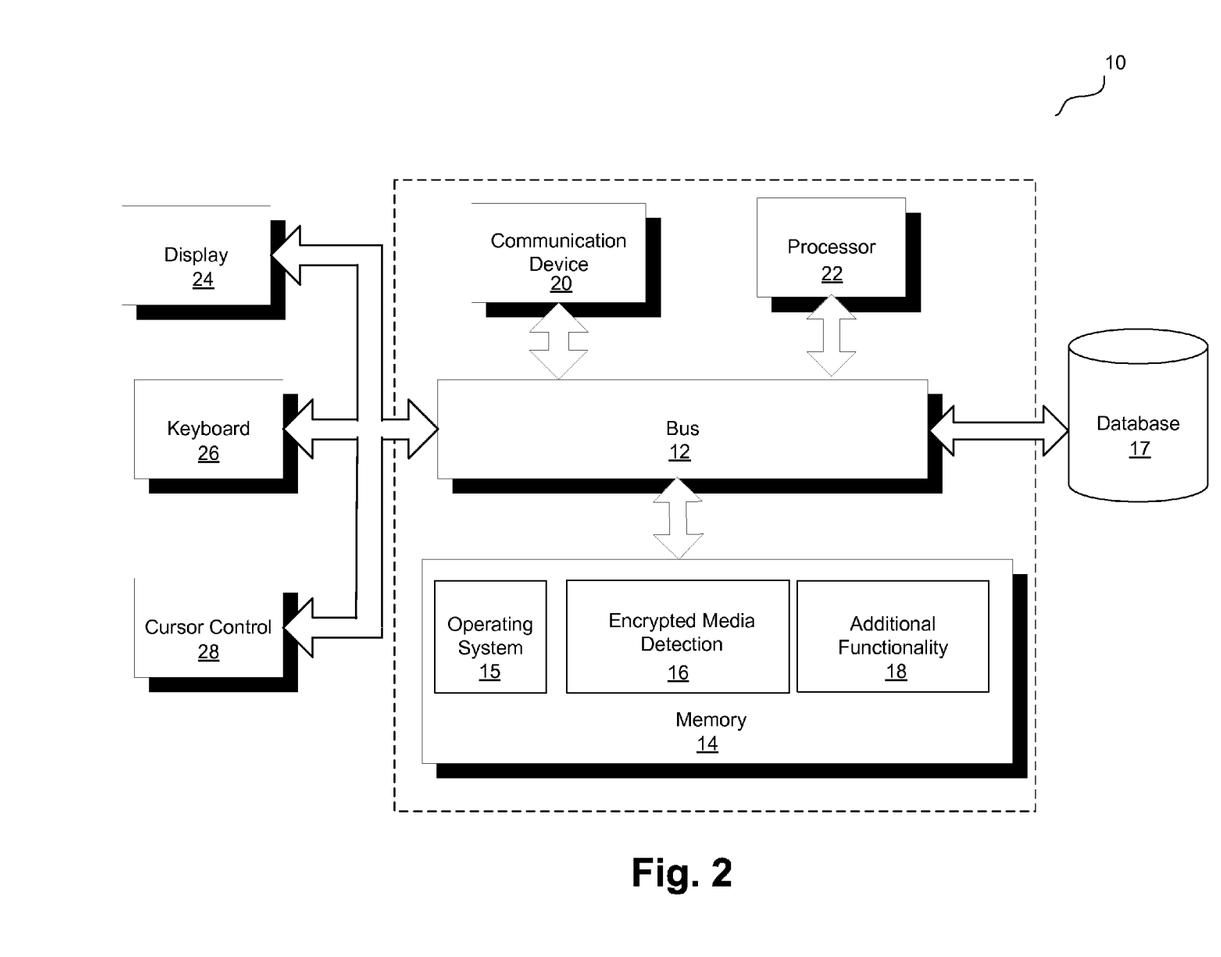
FIG. 2 is a block diagram of a computer server/system in accordance with an embodiment of the present invention.

FIG. 2 is a block diagram of a computer server/system (i.e., system 10) in accordance with an embodiment of the present invention. System 10 can be used to implement any of the network elements shown in FIG. 1 as necessary in order to implement any of the functionality of embodiments of the invention disclosed in detail below. Although shown as a single system, the functionality of system 10 can be implemented as a distributed system. Further, the functionality disclosed herein can be implemented on separate servers or devices that may be coupled together over a network. Further, one or more components of system 10 may not be included. For example, for the functionality of tunneling server 116 of FIG. 1, system 10 may be a server that in general has no need for a display 24 or one or more other components shown in FIG. 2.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable medium. System 10 further includes a communication device 20, such as a network interface card, to provide access to a network. Therefore, a user may interface with system 10 directly, or remotely through a network, or any other method.

Computer readable medium may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include an encrypted media detection module 16 for detecting encrypted media among tunneled encrypted data, and all other functionality disclosed herein. In one example embodiment, encrypted media detection module 16 may implement tunneling server 116 of FIG. 1 in conjunction with one or more remaining elements of FIG. 2. System 10 can be part of a larger system, such as added functionality to the "Acme Packet 6300" session border controller from Oracle Corp. Therefore, system 10 can include one or more additional functional modules 18 to include the additional functionality. A database 17 is coupled to bus 12 to provide centralized storage for redundant encoding module 16 and additional functional modules 18.

In one embodiment, encrypted media detection module 16 and/or additional functional modules 18 may include several modules to provide the encrypted media detection functionality. The modules in one embodiment include a tunneling module that establishes a tunnel with a tunneling client of a user equipment, a media detection module for detecting encrypted media traffic among encrypted data, and an enhancement module for enhancing the detected encrypted media.

Figure 3:
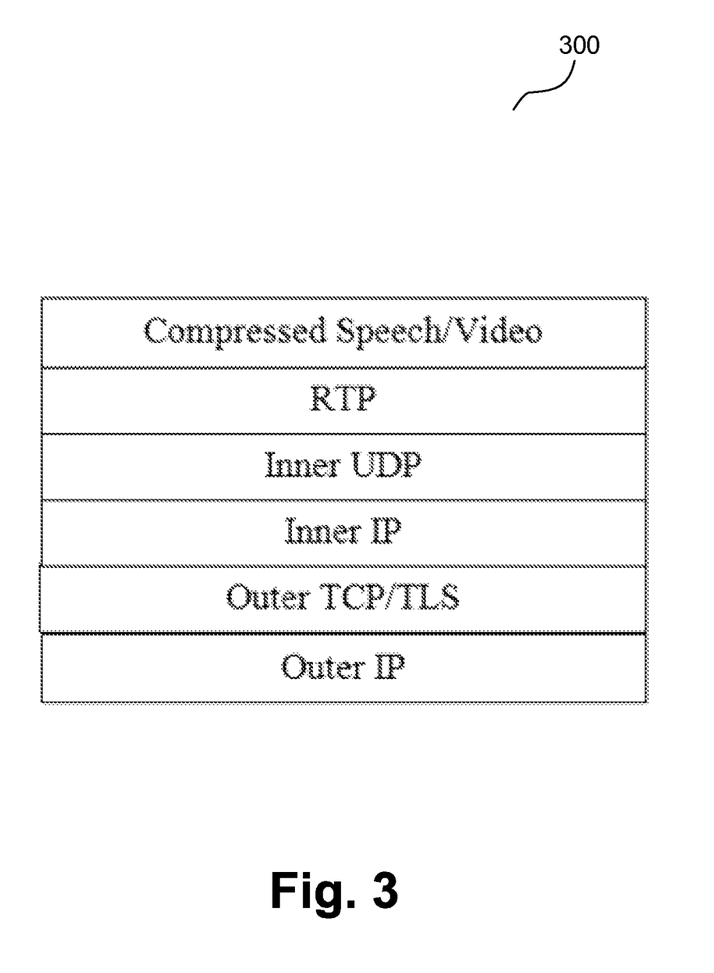
FIG. 3 illustrates example protocol layers in a Tunneled Services Control Function tunneling configuration for encapsulating media traffic according to an embodiment.

In a tunneling configuration, encapsulated (i.e., in a packet/frame) media is typically communicated according to the real-time transport protocol ("RTP" as provided, for example, in IETF RFC 3550). In a TSCF tunneling configuration, RTC (e.g., speech, video, etc.) may be subject to two levels of transport: one at the outer tunnel layer typically according to TCP/TLS, and another at the inner tunnel layer typically according to UDP. FIG. 3 illustrates example protocol layers in a TSCF tunneling configuration 300 for encapsulating media traffic according to an embodiment. In TSCF tunneling configuration 300, compressed media (e.g., speech, video, etc.) is communicated according to RTP at the application layer, and is transported via an inner UDP at the inner transport layer within an inner IP at the inner network layer. The inner layers are within an outer TCP/TLS at the outer transport layer which is in turn within an outer IP at the outer network layer. In one embodiment, since most IP networks block any outer traffic that is not stream-based, TCP/TLS is used at the outer transport layer of TSCF tunnel 108 to guarantee delivery.

Referring again to FIG. 1, in general, media detection mechanisms are critical to encapsulated RTC traffic because when media streams (e.g., real-time voice traffic) are identified, quality improvement or enhancement techniques such as forward error correction and congestion control can be selectively applied to them. Some media detection methods rely on determining media frames based on a predictive change of specific fields, such as payload and header fields. Mechanisms that detect media in some of these known methods are the same mechanisms that generate the media. However, when the traffic is encrypted and tunneled, and generated by a third party, conventional methods of detecting media fail due to the randomness of the data. In contrast, embodiments of the present invention detect the presence of encrypted media data streams using a statistical analysis of inter-frame delay, payload size and entropy.

In one embodiment, ring buffers or circular buffers are included at tunneling client 106 and/or tunneling server 116 in order to implement the functionality. A ring buffer is a data structure that uses a single, fixed-size buffer as if it were connected end-to-end, and allows for the buffering of data streams. In other embodiments, other types of buffers can be used.

In one embodiment, both tunneling client 106 and tunneling server 116 identify unidirectional candidate streams by looking at inner network and transport layers. Further, embodiments store the inter-frame delay of frames belonging to candidate streams in respective circular buffers of size "N" at each of tunneling client 106 and tunneling server 116. Embodiments have as many buffers as there are candidate streams. The functionality in one embodiment for detecting encrypted media using inter-frame delay is performed on inner socket streams by both tunneling client 106 and tunneling server 116.

Further, embodiments store the payload size of frames belonging to candidate streams in respective circular buffers of size "N" at each of tunneling client 106 and tunneling server 116. Embodiments have as many buffers as there are candidate streams. The functionality in one embodiment for detecting encrypted media using payload size is performed by both tunneling client 106 and tunneling server 116.

Further, embodiments store the entropy of the payload of frames belonging to candidate streams in respective circular buffers of size "N" at each of tunneling client 106 and tunneling server 116. Embodiments have as many buffers as there are candidate streams. The functionality in one embodiment for detecting encrypted media using entropy is performed by both tunneling client 106 and tunneling server 116.

The size of the buffers, N, in one embodiment is predefined and stored, and depends on the platform and whether it is a client or server. N indicates how much memory is used to store parameters that are used to determine whether a stream is media encrypted or not. The larger the N, the better the estimation but with the drawback that more system memory is needed. In one embodiment, N=512.

The functionality of detecting the presence of encrypted media data streams in one embodiment is negotiated between tunneling client 106 and tunneling server 116 via a CM Service message exchange.

In one embodiment, both tunneling client 106 and tunneling server 116 determine the mean and variance of the inter-frame delay, payload size, and/or payload entropy for each of the candidate streams. If those values are within a specific range, an encrypted media detection ("EMD") event for that stream is triggered.

Figure 4:
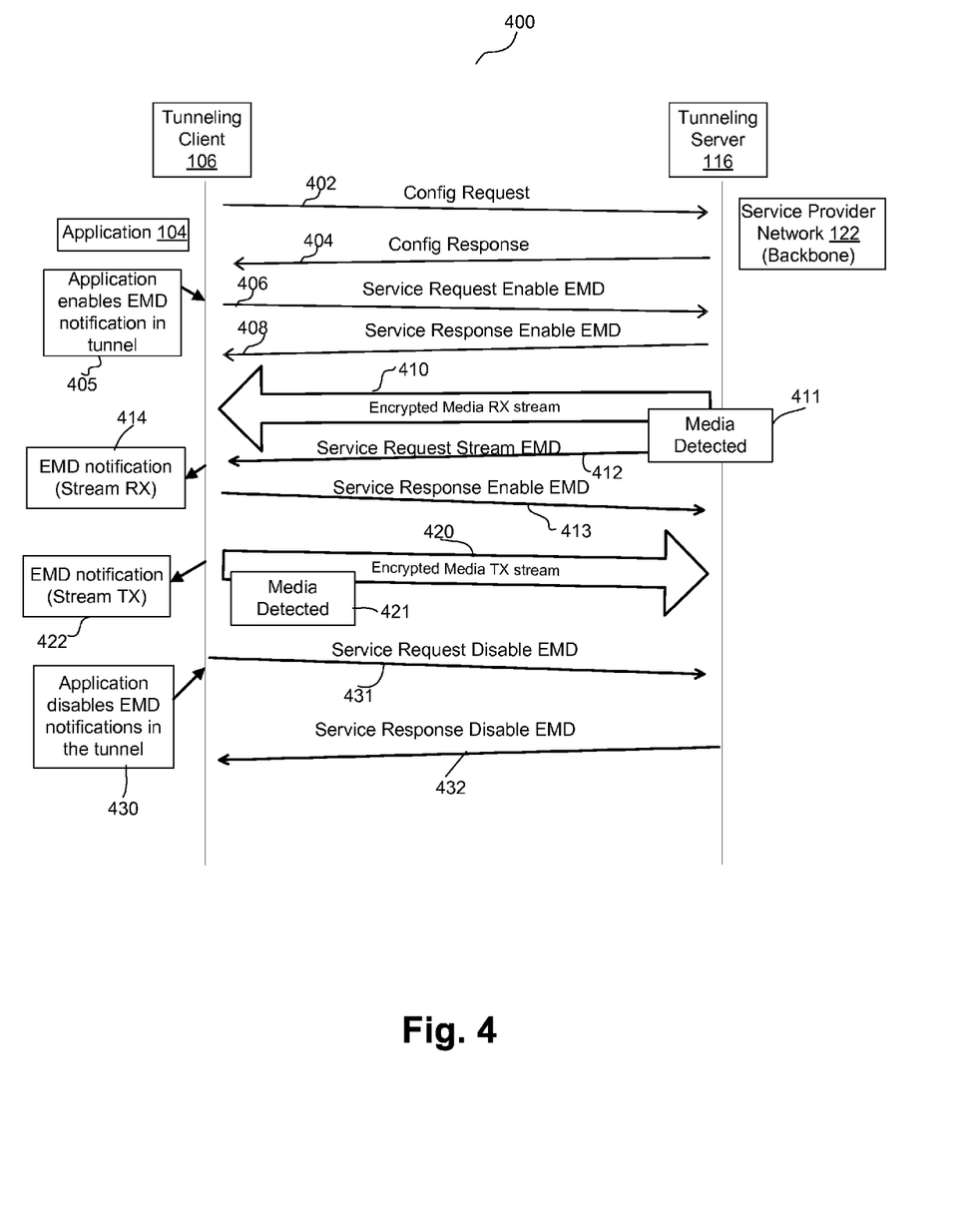
FIG. 4 includes network elements such as a tunneling client in communication with an application, and a tunneling server in communication with a service provider network, as described herein with reference to FIG. 1.

FIG. 4 is an example message sequence diagram 400, including the sequence of messages exchanged between tunneling client 106 and tunneling server 116, for detecting the presence of encrypted media data streams according to some embodiments. FIG. 4 includes network elements such as tunneling client 106 in communication with application 104, and tunneling server 116 in communication with service provider network 122, as described herein with reference to FIG. 1.

At 402, tunneling client 106 sends a configuration request message to tunneling server 116 to establish TSCF tunnel 108. At 404, tunneling server 116 responds to the configuration request message of tunneling client 106 with a configuration response message. Configuration request and response messages allow for tunneling client 106 to obtain configuration information for TSCF tunnel 108 from tunneling server 116, as described in, for example, 3GPP TR 33.830 V0.5.0. In one embodiment, from the application perspective, application 104 at UE 102 creates TSCF tunnel 108 by executing a "tsc_ctrl_new_tunnel" API, and the configuration response message is sent to tunneling server 116 in response to the execution of this API.

Upon completing the exchange of request/response messages, tunneling client 106 and tunneling server 116 may use TSCF tunnel 108 for performing RTC and communicating signaling traffic and media traffic. In one embodiment, when inner signaling and media sockets are needed to place a call (e.g., for communicating SIP call control traffic or RTP media traffic), application 104 creates these sockets on TSCF tunnel 108 by executing a "tsc_socket" API. An inner socket is created by determining a socket type (e.g., datagram vs. stream) and a tunnel on which the socket should be created. In one embodiment, when a socket is created, application 104 binds the socket by executing a "tsc_bind" API. The bind function assigns a specific transport port (e.g., TCP or UDP) to the socket. This port is later used as a source port of all traffic generated by the socket. In one embodiment, if an inner socket is created in TSCF tunnel 108, there is a binding at tunneling server 116 that links the internal IP address of TSCF tunnel 108 to that socket.

and tunneling server 116 responds back with the corresponding service response at 432. Both tunneling client 106 and tunneling server 116 then release all relevant resources, such as buffers, etc., so that memory is freed up.

One embodiment supports encrypted media detection by providing three "Service_Type" TLV values to indicate encrypted media detection and a Connection_Info TLV to indicate source and destination transport as well as network endpoints of the detected unidirectional steams.

Table 1 below provides example TSCF TLVs for providing encrypted media detection functionality according to some embodiments.

TABLE 1

| TLV TYPE | | | SHORT/ | VALUE | | |
|---|---|---|---|---|---|---|
| NAME | VALUE | SEMANTICS | LONG FORMAT | TYPE | LENGTH | NOTES |
| Connection_Info_IPv4 | 24 | Client Connection Info | Short | Octet string | | |
| Connection_Info_IPv6 | 25 | Client Connection Info | Short | Octet string | | |
| Service_Type | 27 | Service Type | Short | Unsigned integer | 1 byte | Enable EMD = 60 Disable EMD = 61 Encrypted Media Detected = 62 |

At 405, application 104 enables EMD notification for TSCF tunnel 108 by executing a notification type "tsc_notification_emd" that is enabled by means of the "tsc_notification_enable" function. At 406, tunneling client 106 issues a service request to initiate the EMD negotiation. At 408, when tunneling server 116 complies with the incoming request it sends back a service response. At this point both tunneling client 106 and tunneling server 116 start sending media. Further, any type of data can be sent in tunnel 108, although TSCF is in general intended for media and signaling data only. All data may not be encrypted. Application 104 provides the encryption (i.e., by generating Secure Real-time Transport Protocol ("SRTP")) that is sent in tunnel 108. Tunnel 108 is unaware of SRTP or its negotiation by means of signaling (SIP).

When encrypted media 410 is detected by tunneling server 116 at 411, as disclosed in detail below, it issues a service request at 412 indicating to tunneling client 106 the stream where the detection occurred. At 413, tunneling client 106 sends back a service response and at 414 forwards an EMD notification to application 104 for the corresponding received unidirectional media stream. The EMD notification 414 to application 104 in one embodiment prompts application 104 to begin enhancement features to the traversing frames.

When encrypted media 420 is detected by tunneling client 106 at 421, as disclosed in detail below, it issues an EMD notification at 422 to application 104 for the corresponding transmitted unidirectional media stream. The EMD notification 422 to application 104 in one embodiment prompts application 104 to begin enhancement features to the traversing frames.

In order to remove the encrypted media detection functionality, the "tsc_notification_disable" function is called by application 104 using the notification handle at 430. Tunneling client 106 issues a service request at 431 to comply Buffered Metrics In one embodiment, the metrics of payload size, inter-frame delay and payload entropy are dynamically stored in individual circular buffers for each unidirectional stream present at tunneling client 106 and tunneling server 116. The buffer size N is preconfigured depending on available resources. Details on these metrics are as follows:

Payload Size: For each outgoing frame, its payload size is stored in a circular buffer.

Inter-frame Delay: For each outgoing frame, the delay with respect to the previous outgoing frame is stored in a circular buffer.

Payload Entropy: The payload entropy is used to measure how random a sequence of data is. An encrypted payload is subjected to cyphers that introduce randomness and therefore generate high entropy. Entropy of a discrete source X is mathematically given by $H(X)=\Sigma p_i \log_2 p_i$ where $p_i$ is the probability of source symbol i. Since the payload of a frame contains a variable number of 8-bit samples, in order to calculate the probabilities of each symbol a histogram of the payload is determined. The histogram provides the value of all $p_i$ with $0 \leq i \leq 255$, such that $H(X)$ can be calculated and stored in a circular buffer.

Encrypted Media Detection ("EMD")

The EMD determination in one embodiment relies on computing the mean and variance of the samples in each of the circular buffers. The mean or expectation of a data set $Y_n$ (with $1 \leq n \leq N$) is given by $$E(Y) = \frac{1}{N}\sum_{i=1}^{N} Y_i$$

and the corresponding variance is given by $$\sigma^2 = \frac{1}{N}\sum_{i=1}^{N} Y_i^2 - E(Y)^2$$

where N is the buffer size.

Encrypted media traffic typically exhibits constant entropy, constant inter-frame delay and constant frame payload size that can evaluated by comparing the variance to the mean. In addition, the absolute value of the entropy in one embodiment is close to 8 to comply with maximum randomness.

The following example pseudocode implements the EMD determination in accordance with one embodiment:

```
mediaDetection(entropy, delay, payloadSize):
    entropyMean = mean(entropy)
    delayMean = mean(delay)
    payloadSizeMean = mean(payloadSize)
    entropyVar = variance(entropy)
    delayVar = variance(delay)
    payloadSizeVar = variance(payloadSize)
    if (entropyMean > α entropy Var AND
        delayMean > α delay Var AND
        payloadSizeVar > α payloadSizeMean AND
        entropyMean > 8 β)
        return TRUE
```

-continued

```
    else
        return FALSE
    endif
```

The "mediaDetection" function takes all three circular buffer data sets as arguments and uses the "mean" and "variance" functions to obtain the corresponding values that are compared in order to determine whether encrypted media has been detected or not. The constants α and β are used to control the sensitivity of the detection. In one embodiment, α=5 and β=0.7.

In one embodiment, encrypted media detection functionality is requested by application 104 via tsc_socket APIs, more specifically by using a "tsc_notification_emd" notification. The following example pseudocode shows how the notification is enabled and what the notification callback function looks like, where "handle" indicates the tunnel handle:

```
tsc_notification_handle notf = tsc_notification_enable(handle, tsc_
notification_emd, emd_notification, NULL);
void emd_notification(tsc_notification_data *notification)
{
tsc_notification_emd_info_data *emd data = (tsc_notification_emd_ info_
data *)notification->data;
    if (emd_data && emd _data->available == tsc_bool_true) {
        if (emd _data->enabled == tsc_bool_true) {
            printf("encrypted media detection enabled \n");
        } else {
            print("encrypted media detection disabled \n");
        }
    } else {
        print("encrypted media detection notification not allowed \n");
    }
}
```

The fourth NULL parameter in "tsc_notification_enable" is an opaque/private data pointer that can be recovered in the "tsc_notification_data" structure upon callback. To disable the encrypted media detection functionality, the tsc_notification_disable API is called as follows:

tsc_notification_disable(notf);

where "notf" is the initial notification handle obtained when enabling the encrypted media detection functionality.

One embodiment that is implemented using an SBC, such as the Acme Packet 6300 from Oracle Corp., provides a configuration object "tscf-interface" that includes a parameter "assigned-services" that includes a keyword "EMD". Table 2 below provides an example of the tscf-interface configuration object according to one embodiment.

TABLE 2

| Parameter Name | Extensible markup language ("XML") tag | Data Type and Default | Value Ranges/Possible Values | Required or Optional (for feature to work)? |
|---|---|---|---|---|
| assigned-services | assigned-services | String: blank | EMD to enable encrypted media detection | Optional |

The following functionality provides an example interface configuration for providing encrypted media detection according to one embodiment:

```
tscf-interface
    realm-id                                access
    state                                   enabled
    max-tunnels                             200
    local-address-pools                     lp-1
    assigned-services                       SIP, EMD
    tscf-port
    address                                 192.168.1.9
    port                                    2105
    transport-protocol                      TCP
    tls-profile
    rekey-profile
    last-modified-by                        admin@console
    last-modified-date                      2015-02-01 12:00:00
```

The following is an example extensible markup language ("XML") functionality for providing encrypted media detection according to one embodiment:

```
<tscfInterface realmID='access'
    state='enabled'
    maxTunnels='200'
    assignedServices='SIP,EMD'
    options=''
    lastModifiedBy='admin@console'
    lastModifiedDate='2015-02-01 12:00:00'
    objectId='59'>
    <key>access</key>
    <localAddressPool name='lp-1'/>
    <tscfPort address='192.168.1.9'
        port='2105'
        transProtocol='TCP'
        tlsProfile=''
        rekeyProfile=''
</tscfInterface>
```

Figure 5:
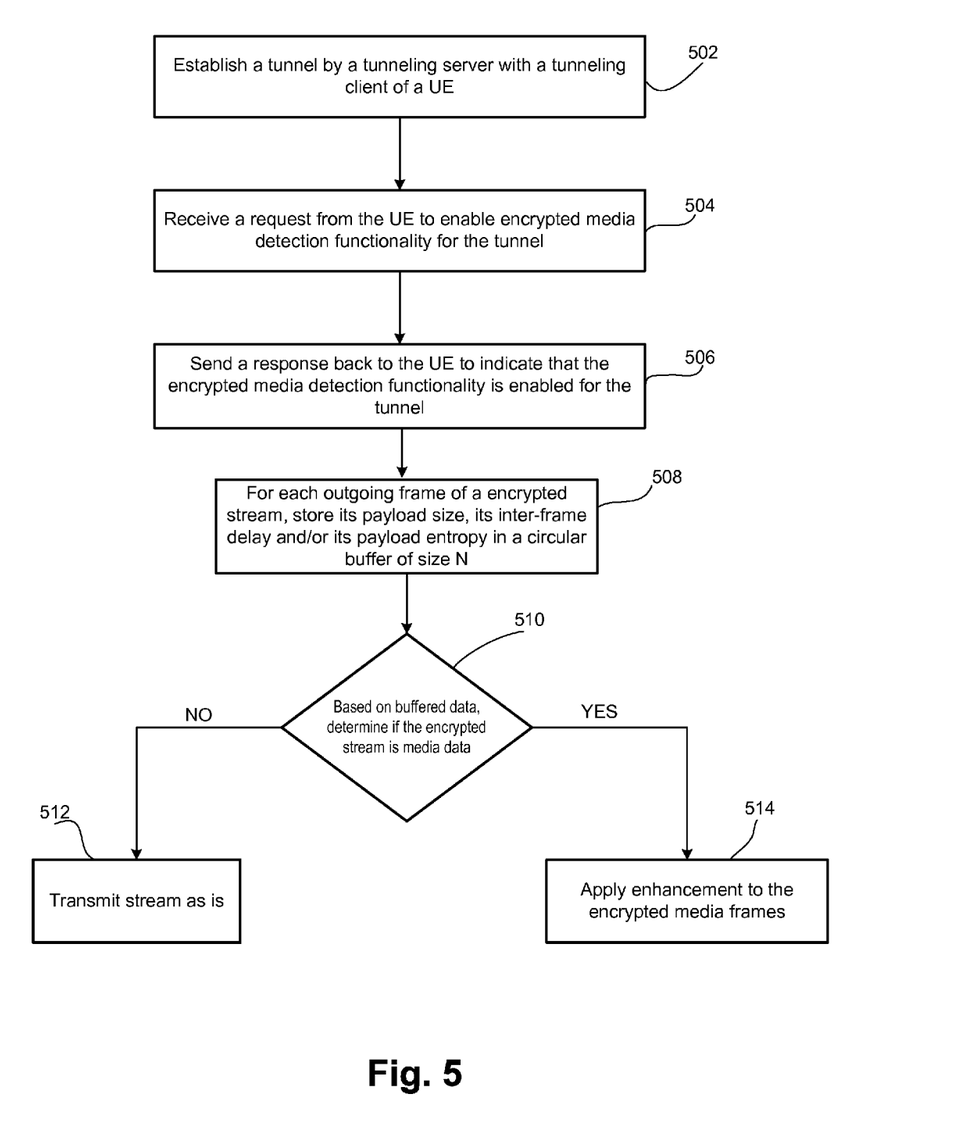
FIG. 5 is a flow diagram of an encrypted media detection module of FIG. 2 and/or a tunneling client and tunneling server of FIG. 1 when performing encrypted media detection in accordance with embodiments of the present invention.

FIG. 5 is a flow diagram of encrypted media detection module 16 of FIG. 2 and/or tunneling client 106 and tunneling server 116 of FIG. 1 when performing encrypted media detection in accordance with embodiments of the present invention. In one embodiment, the functionality of the flow diagram of FIG. 5 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 502, tunneling client 106 and tunneling server 116 establish TSCF tunnel 108. Tunnel 108 can include multiple inner sockets, such as a separate inner socket for speech data, video data, etc.

At 504, client encrypted media detection module 118 at tunneling client 106 sends a TSCF service request to tunneling server 116 to enable encrypted media detection functionality for tunnel 108. In one embodiment, client encrypted media detection module 118 sends the request when application 104 executes an API to enable the encrypted media detection functionality for tunnel 108. The functionality is implemented for all streams that traverse inner sockets of tunnel 108.

At 506, server encrypted media detection module 120 at tunneling server 116 sends a TSCF service response back to client encrypted media detection module 118 to confirm that encrypted media detection functionality is enabled for tunnel 108.

After the functionality at 506, encrypted data frames will traverse tunnel 108 in the form of streams. Non-encrypted data may also traverse tunnel 108. At 508, for each outgoing frame, at both tunneling client 106 and tunneling server 116, its payload size, its inter-frame delay and/or its payload entropy is stored in a circular buffer of size N.

At 510, for each encrypted data stream traversing tunnel 108, it is determined if the data stream is a media data stream based on the stored payload size, inter-frame delay and/or payload entropy.

If no at 510, at 512 the stream can be transmitted as is.

If yes at 510, at 514 enhancement features can be applied to the encrypted media data. In one embodiment, enhancement features are enabled by application 104 as soon as it is notified by tunneling client 106 that is has detected media in either of the directions. Media is typically full duplex so a notification for each direction should be received (i.e., notifications 414 and 422 of FIG. 4).

As disclosed, once encrypted media is detected, tunneling client 106 and/or tunneling server 116 can apply different media quality improvement mechanisms and enhancement features on the media stream. These improvements may include media redundancy, dynamic datagram tunnels ("DDT"), header compression, concealed datagram transport, congestion control and multipath support. In general, since each enhancement is resource intensive, only one or two of the possible enhancements are enabled.

Details on how media redundancy can be applied to the encrypted media stream are disclosed in U.S. patent application Ser. No. 14/831,182, the disclosure of which is hereby incorporated by reference.

Details on how DDT can be applied to the encrypted media stream are disclosed in U.S. patent application Ser. No. 14/519,519, the disclosure of which is herein incorporated by reference.

Details on how header compression can be applied to the encrypted media stream are disclosed in U.S. patent application Ser. No. 14/637,550, the disclosure of which is hereby incorporated by reference.

Details on how concealed datagram transport can be applied to the encrypted media stream are disclosed in U.S. patent application Ser. No. 14/657,227, the disclosure of which is hereby incorporated by reference.

Details on how multipath support can be applied to the encrypted media stream are disclosed in U.S. patent application Ser. No. 14/734,300, the disclosure of which is hereby incorporated by reference.

As disclosed, embodiments check tunneled inner traffic and uses statistical analysis to identify encrypted media streams. Embodiments keep track of up to three different metrics that are updated as frames are encapsulated: (1) inter-frame periodicity; (2) payload size; and (3) entropy or randomness. Embodiments allow the detection of encapsulated encrypted media streams, which allows differentiated services to be applied to improve the overall end user experience.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to perform encrypted media detection for real-time communications (RTC), the encrypted media detection comprising:

establishing a tunnel by a tunneling server with a tunneling client of a user equipment (UE);

receiving a request from the UE to enable the encrypted media detection for the tunnel;

sending a response back to the UE to indicate that the encrypted media detection is enabled for the tunnel;

for each encrypted frame transmitted over the tunnel, storing using a buffer corresponding data, the corresponding data comprising a payload size, an inter-frame delay and a payload entropy; and based on a computation comprising a statistical analysis that uses the payload size, inter-frame delay and payload entropy, determining when the encrypted frame comprises an encrypted media data frame comprising, for each of the payload size, inter-frame delay and payload entropy, determining a variance between the stored corresponding data and determining a mean of the stored corresponding data, the encrypted media data frame comprising at least one of voice traffic or video traffic.

2. The computer readable medium of claim 1, wherein the tunnel is established according to a tunneled services control function (TSCF) standard.

3. The computer readable medium of claim 2, wherein encrypted frames traverse the tunnel on an inner socket.

4. The computer readable medium of claim 1, wherein the mean of a data set $Y_n$ (with $1 \leq n \leq N$) is $$E(Y) = \frac{1}{N}\sum_{i=1}^{N} Y_i$$

and a corresponding variance is $$\sigma^2 = \frac{1}{N}\sum_{i=1}^{N} Y_i^2 - E(Y)^2$$

where N is a size of a buffer that stores the corresponding data.

5. The computer readable medium of claim 1, the encrypted media detection further comprising in response to the detecting that one or more of the frames comprise media, sending a notification to the tunneling client.

6. The computer readable medium of claim 5, wherein in response to the notification, the tunneling client applies enhancement features to the transmitted frames.

7. The computer readable medium of claim 6, wherein the enhancement features comprise at least one of: media redundancy; dynamic datagram tunnels; header compression; concealed datagram transport; congestion control; or multipath support.

8. The computer readable medium of claim 1, wherein the tunnel comprises multiple inner sockets and the request is received via an application programming interface executed by an application on the UE.

9. A method of encrypted media detection for real-time communications (RTC), the method comprising:
establishing a tunnel by a tunneling server with a tunneling client of a user equipment (UE);
receiving a request from the UE to enable the encrypted media detection for the tunnel;
sending a response back to the UE to indicate that the encrypted media detection is enabled for the tunnel;
for each encrypted frame transmitted over the tunnel, storing corresponding data, the corresponding data comprising of a payload size, an inter-frame delay and a payload entropy; and
based on a computation comprising a statistical analysis that uses the payload size, inter-frame delay and payload entropy, determining when the encrypted frame comprises an encrypted media data frame comprising, for each of the payload size, inter-frame delay and payload entropy, determining a variance between the stored corresponding data and determining a mean of the stored corresponding data, the encrypted media data frame comprising at least one of voice traffic or video traffic.

10. The method of claim 9, wherein the tunnel is established according to a tunneled services control function (TSCF) standard.

11. The method of claim 10, wherein the encrypted frames traverse the tunnel on an inner socket.

12. The method of claim 9, wherein the mean of a data set $Y_n$ (with $1 \leq n \leq N$) is $$E(Y) = \frac{1}{N}\sum_{i=1}^{N} Y_i$$

and a corresponding variance is $$\sigma^2 = \frac{1}{N}\sum_{i=1}^{N} Y_i^2 - E(Y)^2$$

where N is a size of a buffer that stores the corresponding data.

13. The method of claim 9, the method further comprising in response to the detecting that one or more of the frames comprise media, sending a notification to the tunneling client.

14. The method of claim 13, wherein in response to the notification, the tunneling client applies enhancement features to the transmitted frames.

15. The method of claim 14, wherein the enhancement features comprise at least one of: media redundancy; dynamic datagram tunnels; header compression; concealed datagram transport; congestion control; or multipath support.

16. The method of claim 9, wherein the tunnel comprises multiple inner sockets and the request is received via an application programming interface executed by an application on the UE.

17. A system comprising:
a processor; and
a storage device coupled to the processor that stores an encrypted media detection module, the encrypted media detection module, when executed by the processor, implementing modules, the modules comprising:
a tunneling module that establishes a tunnel between a tunneling client of a user equipment (UE) and a tunneling server, receives a request from the UE to enable the encrypted media detection for the tunnel and sends a response back to the UE to indicate that the encrypted media detection is enabled for the tunnel; and
a media detection module that for each encrypted frame transmitted over the tunnel, stores corresponding data, the corresponding data comprising a payload size, an inter-frame delay and a payload entropy, and based on a computation comprising a statistical analysis that uses the payload size, inter-frame delay and payload entropy, determines when the encrypted frame comprises an encrypted media data frame comprising, for each of the payload size, inter-frame delay and payload entropy, determining a variance between the stored corresponding data and determining a mean of the stored corresponding data, the encrypted media data frame comprising at least one of voice traffic or video traffic.

18. The system of claim 17, further comprising:
an enhancement module that applies enhancement features to the transmitted frames, wherein the enhancement features comprise at least one of: media redundancy; dynamic datagram tunnels; header compression; concealed datagram transport; congestion control; or multipath support.

19. The system of claim 17, wherein the tunnel is established according to a tunneled services control function (TSCF) standard.

20. The system of claim 17, wherein the tunnel comprises multiple inner sockets and the request is received via an application programming interface executed by an application on the UE.

* * * * *

UNITED STATES PATENT AND TRADEMARK OFFICE
CERTIFICATE OF CORRECTION

PATENT NO. : 9,866,384 B2  
APPLICATION NO. : 14/881592  
DATED : January 9, 2018  
INVENTOR(S) : Herrero Page 1 of 1

It is certified that error appears in the above-identified patent and that said Letters Patent is hereby corrected as shown below:

On the Title Page

Column 1, item (73) under Assignee, Line 1, delete "Oacle" and insert -- Oracle --, therefor.

Signed and Sealed this
Seventeenth Day of July, 2018

Andrei Iancu
*Director of the United States Patent and Trademark Office*